(12) United States Patent
Lin

(10) Patent No.: US 7,128,458 B2
(45) Date of Patent: Oct. 31, 2006

(54) BACKLIGHT MODULE HAVING UV LIGHT FILTER

(75) Inventor: Ya-Lan Lin, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 178 days.

(21) Appl. No.: 10/741,013

(22) Filed: Dec. 19, 2003

(65) Prior Publication Data
US 2005/0041412 A1 Feb. 24, 2005

(30) Foreign Application Priority Data
Aug. 19, 2003 (TW) .............................. 92122717 A

(51) Int. Cl.
*F21V 5/02* (2006.01)
*F21V 9/06* (2006.01)
(52) U.S. Cl. ................. 362/620; 362/622; 362/615; 359/361
(58) Field of Classification Search ........ 362/620–622, 362/293, 611, 26, 614, 615; 359/361; 40/76, 40/367, 543
See application file for complete search history.

(56) References Cited

U.S. PATENT DOCUMENTS

| 2,860,059 | A | * | 11/1958 | Molter et al. ................ 359/361 |
| 4,155,122 | A | * | 5/1979 | Budmiger .................... 359/361 |
| 5,211,463 | A | * | 5/1993 | Kalmanash .................. 362/614 |
| 5,479,275 | A | * | 12/1995 | Abileah ....................... 362/620 |
| 5,836,999 | A | * | 11/1998 | Eckhouse et al. .............. 607/88 |
| 5,982,090 | A | * | 11/1999 | Kalmanash .................. 362/611 |
| 6,773,104 | B1 | * | 8/2004 | Cornelius et al. ........... 359/361 |
| 2002/0067542 | A1 | * | 6/2002 | Okamori et al. ............ 359/361 |
| 2002/0141173 | A1 | * | 10/2002 | Lee et al. ...................... 362/26 |

FOREIGN PATENT DOCUMENTS

| JP | H06-28926 | 4/1994 |
| JP | 2001-073591 | 3/2001 |
| JP | 2001343641 | 12/2001 |

* cited by examiner

*Primary Examiner*—Sandra O'Shea
*Assistant Examiner*—Ismael Negron
(74) *Attorney, Agent, or Firm*—Thomas, Kayden, Horstemeyer & Risley

(57) ABSTRACT

A backlight module includes a spacer, a light source and an ultraviolet rays light filter. The spacer is formed by a first plate and a second plate. The light source is disposed in the spacer and emits light, which spreads through the second plate and out of the backlight module. The light filter is disposed on the second plate.

6 Claims, 1 Drawing Sheet

BACKLIGHT MODULE HAVING UV LIGHT FILTER

BACKGROUND OF THE INVENTION

1. Field of the Invention

The present invention relates to a backlight module and in particular to a backlight module directly filtering ultraviolet rays.

2. Description of the Prior Art

Conventionally, a backlight module is provided with light-filtering to prevent color distortion of the backlight module. In detail, the light tube of the backlight module is generally coated with a light-filtering material, such as magnesia, to filter out ultraviolet rays thereby preventing color distortion.

The disclosed method complicates production and is still unable to completely filter ultraviolet rays.

SUMMARY OF THE INVENTION

In order to address the disadvantages of the aforementioned backlight module, the present invention provides a backlight module disposed on an input surface of a light guide plate capable of directly filtering ultraviolet rays.

The backlight module includes a spacer, a light source and a light filter. The spacer is formed by a first plate and a second plate. The light source is disposed in the spacer and emits the light which spreads through the second plate and out of the backlight module. The light filter is disposed on the second plate to filter ultraviolet rays.

The first plate is a reflector plate.

The second plate is a light guide plate.

The second plate has an input surface and an output surface. Light emitted from the light source spreads through the input surface into the second plate. The light then passes through the output surface and out of the second plate. The light filter is disposed on the input surface.

Light is filtered by a film adhered to the second plate.

A light-filtering oxide forms on the second plate, for example, the light-filtering oxide is coated, deposited, or sputtered on the second plate.

The backlight module further includes a diffuser disposed on the second plate.

The diffuser includes a first diffuser disposed on the second plate, a prism disposed on the first diffuser, and a second diffuser disposed on the prism.

The light source is a lamp.

According to the present invention, the light filter is disposed on the input surface of the light guide plate directly, and is capable of completely filtering out ultraviolet rays. Moreover, by forming a light-filtering oxide on the light guide plate or adhering a filter film on the second plate. The method of the present invention is less complicated, easily repeatable and reduces costs.

DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
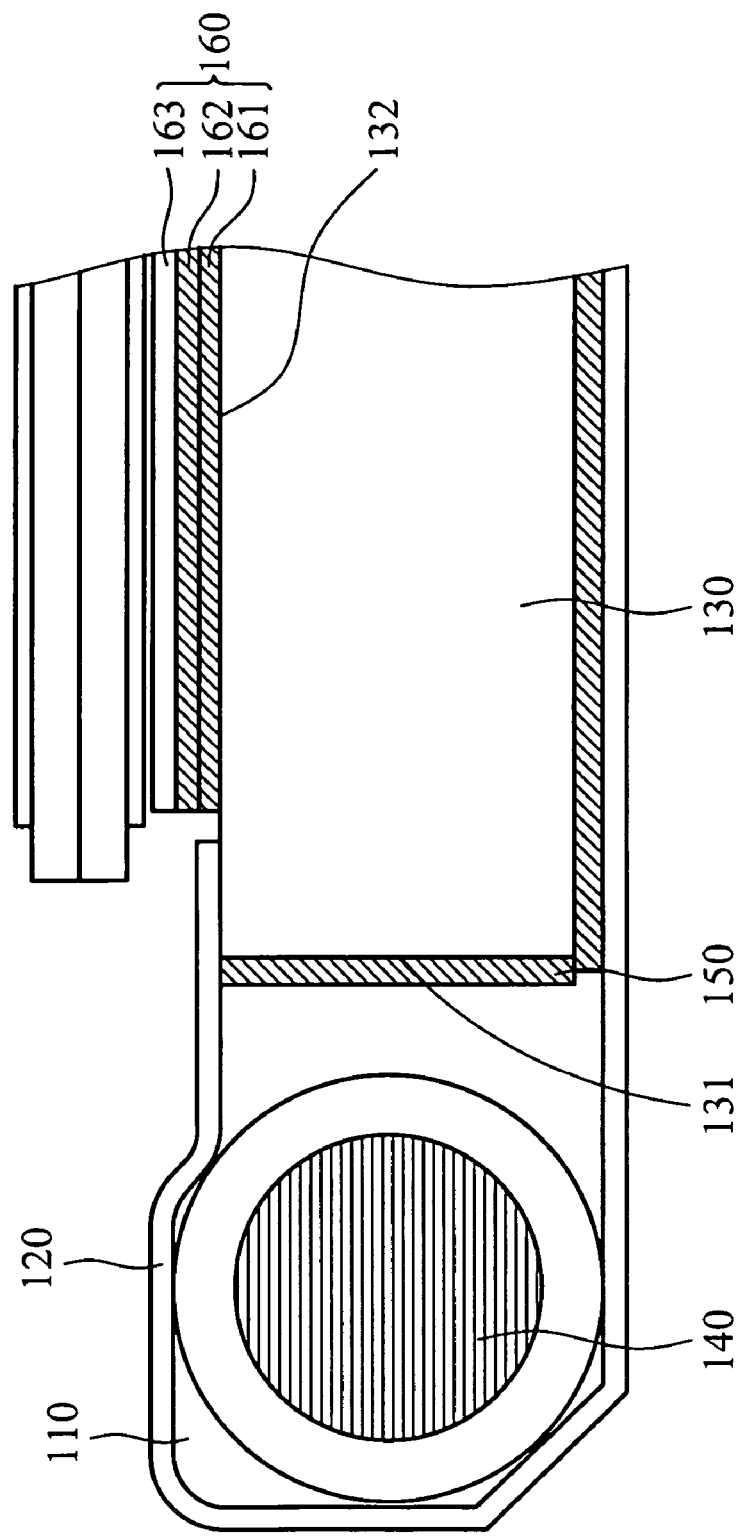
FIG. 1 is a schematic view of the present invention.

FIG. 1 shows a schematic view of a first embodiment in accordance with the present invention. The backlight module 100 has a first plate and a second plate forming a spacer 110. In the embodiment, the first plate is a reflector plate 120 and the second plate is a light guide plate 130. The light guide plate 130 has an input surface 131 and an output surface 132. The lamp 140 serving as the light source is disposed in the spacer 110. Light emitted from the lamp 140 spreads through the input surface 131 and into the light guide plate 130, and passes through the output surface 132 and out of the light guide plate 130.

To filter ultraviolet rays out of light, a light filter is disposed on the input surface 131 of the light guide plate 130. In the embodiment, the light guide plate can be a filter film 150 directly adhered to the input surface 131. The light guide plate also can be a UV filtering oxide (such as magnesia) formed on the input surface 131 to completely filter ultraviolet rays out of light entering the light guide plate 130.

Additionally, to assist uniform scattering of light over the entire panel, a diffuser 160 is disposed on the light guide plate 130. The diffuser 160 includes a first diffuser 161, a prism 162 and a second diffuser 163. The first diffuser 161 is disposed on the light guide plate 130, the prism 162 is disposed on the first diffuser 161 and the second diffuser 163 is disposed on the prism 162. The number and sequence of the prisms and diffusers are variable based on requirements.

Accordingly, by directly placing the light filter on the input surface of the light guide plate, ultraviolet rays can be effectively filtered out of light entering the light guide plate 130. Additionally, by forming the light filtering material directly on the light guide plate or adhering the filter film directly on the second plate is less complicated the conventional method of coating light filtering material on the lamp, thus achieving easy repeat ability, and effectively reducing costs.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module comprising:
   a spacer formed by a first plate and a light guide plate;
   a light source disposed in the spacer emitting the light which spreads through the light guide plate and out of the backlight module;
   a light filter disposed on the light guide plate to filter ultraviolet rays;
   a first diffuser disposed on the light guide plate;
   a prism disposed on the first diffuser; and
   a second diffuser disposed on the prism.

2. The backlight module as claimed in claim 1, wherein the first plate is a reflector plate.

3. The backlight module as claimed in claim 1, wherein the light guide plate has an input surface and an output surface, the light emitted from the light source spreads through the input surface and onto the light guide plate, then spreads through the output surface and out from the light guide plate, and the light filter is disposed on the input surface.

4. The backlight module as claimed in claim 1, wherein the light filter is a filter film adhered to the light guide plate.

5. The backlight module as claimed in claim 1, wherein the light filter is a light-filtering oxide formed on the light guide plate.

6. The backlight module as claimed in claim 1, wherein the light source is a lamp.

* * * * *